(12) United States Patent
Ferrans et al.

(10) Patent No.: US 7,003,464 B2
(45) Date of Patent: Feb. 21, 2006

(54) DIALOG RECOGNITION AND CONTROL IN A VOICE BROWSER

(75) Inventors: James Ferrans, Wheaton, IL (US); Jonathan Engelsma, Hudsonville, MI (US); Michael Pearce, Barrington, IL (US); Mark Randolph, Kildeer, IL (US); Jerome Vogedes, Wind Lake, WI (US)

(73) Assignee: Motorola, Inc., Schaumburg, IL (US)

( * ) Notice: Subject to any disclaimer, the term of this patent is extended or adjusted under 35 U.S.C. 154(b) by 177 days.

(21) Appl. No.: 10/339,067

(22) Filed: Jan. 9, 2003

(65) Prior Publication Data

US 2004/0138890 A1 Jul. 15, 2004

(51) Int. Cl.
*G10L 21/00* (2006.01)

(52) U.S. Cl. ................... 704/270.1; 704/270; 704/201; 715/760

(58) Field of Classification Search ............... 715/760; 704/270.1, 275, 200, 233, 277, 260, 270, 704/201, 246, 231
See application file for complete search history.

(56) References Cited

U.S. PATENT DOCUMENTS

| | | | | |
|---|---|---|---|---|
| 5,459,814 | A * | 10/1995 | Gupta et al. | 704/233 |
| 6,157,705 | A * | 12/2000 | Perrone | 379/88.01 |
| 6,662,163 | B1 * | 12/2003 | Albayrak et al. | 704/275 |
| 6,745,163 | B1 * | 6/2004 | Brocious et al. | 704/260 |
| 2002/0003547 | A1 * | 1/2002 | Wang et al. | 345/727 |
| 2002/0097692 | A1 | 7/2002 | Rutoistenmake | |
| 2002/0165719 | A1 * | 11/2002 | Wang et al. | 704/270.1 |
| 2002/0184373 | A1 | 12/2002 | Maes | |
| 2002/0191756 | A1 * | 12/2002 | Guedalia et al. | 379/88.13 |
| 2002/0194388 | A1 | 12/2002 | Boloker et al. | |
| 2003/0130854 | A1 * | 7/2003 | Galanes et al. | 704/277 |
| 2003/0200080 | A1 * | 10/2003 | Galanes et al. | 704/200 |

FOREIGN PATENT DOCUMENTS

| | | |
|---|---|---|
| WO | WO 02/19152 A1 | 3/2002 |
| WO | WO 02/079896 A2 | 10/2002 |

OTHER PUBLICATIONS

Maes S. et al. "Speech Engine Remote Control Protocols by Treating Speech Engines and Audio Sub-sustems as Web Services." Internet Draft website: http://ielreport.isoc.org/ids/draft-maes-speechsc-web-services-00.txt; Jun., 2002.

Shanmugham, S. "MRCP: Media Resource Control Protocol." *Internet Engineering Task Force*; Jan. 15, 2002.

"3GPP Generation Partnership Project; Technical Specification Group Sevices and Systems Aspects; Feasibility study for speech enabled services." (3GPP TR 22.977) vol. 2.0.0, 2002.

* cited by examiner

*Primary Examiner*—Vijay Chawan
(74) *Attorney, Agent, or Firm*—Brian M. Mancini; Matthew C. Loppnow

(57) ABSTRACT

A voice browser dialog enabler for multimodal dialog uses a multimodal markup document with fields have markup-based forms associated with each field and defining fragments. A voice browser driver resides on a communication device and provides the fragments and identifiers that identify the fragments. A voice browser implementation resides on a remote voice server and receives the fragments from the driver and downloads a plurality of speech grammars. Input speech is matched against those speech grammars associated with the corresponding identifiers received in a recognition request from the voice browser driver.

20 Claims, 4 Drawing Sheets

DIALOG RECOGNITION AND CONTROL IN A VOICE BROWSER

FIELD OF THE INVENTION

The present invention relates to the control of an operating mode of a radio communication device. More particularly the invention relates to a method for operating a multimode radio communication device on different systems.

BACKGROUND OF THE INVENTION

Radio communication devices, such as cellular phones, have ever-expanding processing capabilities and subsequently software application to run on them. However, the size of the device makes it difficult to attach the user interface hardware normally available for a computer, for example. Cellular phones have small keyboards and displays. However, techniques have been developed to take advantage of the basic voice communication ability inherent in the cellular phone. Speech recognition technology is now commonly used in radio communication devices. Voice activated dialing is now readily available. With the advent of data services including use of the Internet, it has become apparent that speech-enabled services can greatly enhance the functionality of communication devices. Towards this end, a Voice Extensible Markup Language (VoiceXML) has been developed to facilitate speech-enabled services for wireless communication devices. However, with the advent of speech-enabled services available to consumers, some serious problems arise in regard to portable communication devices.

Speech enabled services provide difficult challenges when used in conjunction with multimodal services. In multimodal dialogs, an input can be from speech, a keyboard, a mouse and other input modalities, while an output can be to speakers, displays and other output modalities. A standard web browser implements keyboard and mouse inputs and a display output. A standard voice browser implements speech input and audio output. A multimodal system requires that the two browsers (and possibly others) be combined in some fashion. Typically, this requires various techniques to properly synchronize application having different modes. Some of these techniques are described in 3GPP TR22.977, "$3^{rd}$ Generation Partnership Project; Technical Specification Group Services and Systems Aspects; Feasibility study for speech enabled services; (Release 6), v2.0.0 (2002–09).

In a first approach, a "fat client with local speech resources" approach puts the web (visual) browser, the voice browser, and the underlying speech recognition and speech synthesis (text-to-speech) engines on the same device (computer, mobile phone, set-top box, etc.). This approach would be impossible to implement on small wireless communication devices, due to the large amount of software and processing power needed. A second approach is the "fat client with server-based speech resources", where the speech engines reside on the network, but the visual browser and voice browser still reside on the device. This is somewhat more practical on small devices than the first solution, but still very difficult to implement on small devices like mobile phones. A third approach is the "thin client", where the device only has the visual browser, which must be coordinated with a voice browser and the speech engines located on the network. This approach fits on devices like mobile phones, but the synchronization needed to keep the two browsers coordinated makes the overall system fairly complex.

In all these approaches, a problem still exists, in that, the solutions are either impractical to put on smaller devices, or require complex synchronization.

Therefore, there is a need to alleviate the problems of incorporating voice browser technology and multimodal technology into a wireless communication device. It would also be of benefit to provide a solution to the problem without the need for expanded processing capability in the communication device. It would also be advantageous to avoid complexity without any significant additional hardware or cost in the communication device.

BRIEF DESCRIPTION OF THE DRAWINGS

FIG. 1 shows a block diagram of a first prior art multimodal communication system, in;

DETAILED DESCRIPTION OF THE PREFERRED EMBODIMENTS

The present invention divides the voice browser application into two components rather than treating it as a unitary whole. In this way, the amount of software on the device is greatly minimized, allowing multimodal dialogs to run on much smaller devices than is otherwise the case, and for less cost. By doing browser synchronization on the device, much of the complexity of the prior art solutions is avoided. In addition, by having a common voice browser driver, a multimodal application can be written as a stand-alone program instead of a browser application. This improvement is accomplished at very little cost in the communication device. Instead of adding processing power, which adds cost and increases the device size, the present invention advantageously utilizes the existing processing power of the communication device in combination with software solutions for the voice browser necessary in a multimodal dialog.

Figure 1:
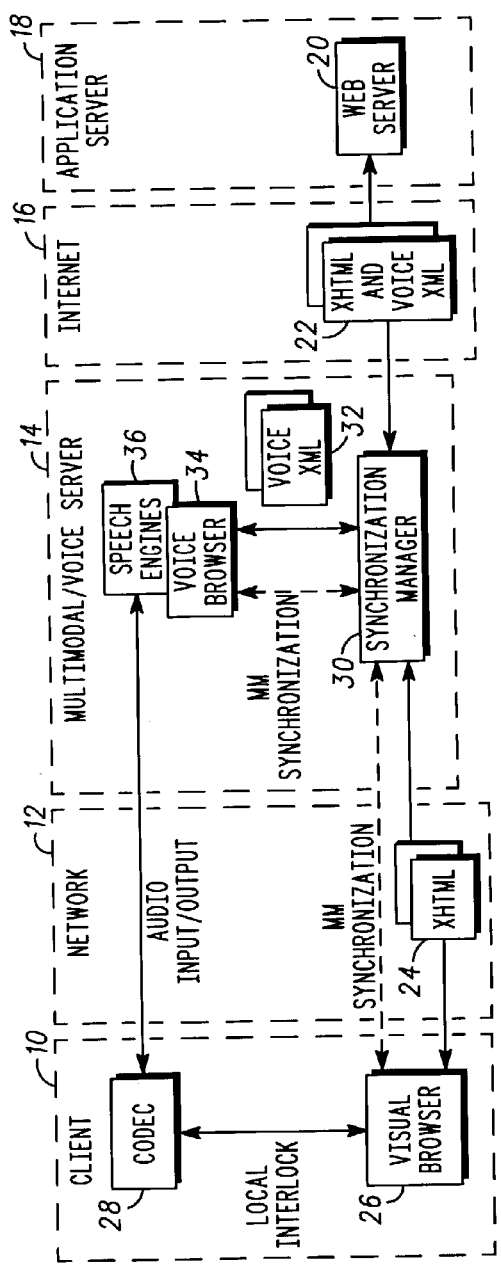

Referring to FIG. 1, a prior art architecture is provided wherein most or all of the processing for multimodal communication is done off of the (thin) communication device. It should be understood that there are many more interconnections required for proper operation of a multimodal dialog that are not shown for the sake of simplicity. In the example shown, a client communication device 10 wants to access a multimodal application present on an application server 18. Typically, the application server 18 uses an existing, resident web server 20 to communicate on the Internet 16. A multimodal/voice server 14 in a communication system, of a service provider for example, is coupled to the Internet 16 and provides service to a cellular network 12 which in turn couples to the client communication device 10. The web server provides a multimodal markup document 22 including visual (XHTML) markup and voice (VoiceXML) markup to provide an interface with a user. As is known, an XHTML markup file is a visual form that can provide several fields for information interaction with a user. For example, a user can point and click on a "radio button" field to indicate a choice, or can type text into an empty field to enter information. VoiceXML works in conjunction with XHTML to provide a voice interface to enter information into fields of the markup document. For example, VoiceXML markup can specify an audio prompt that requests a user to enter information into a field. A user could then speak something (or enter text if desired) and voice browser VoiceXML would listen to or convert this speech and compare it against grammars specified or referred to by the VoiceXML markup that define the acceptable responses to the prompt. VoiceXML markup can be associated with any field of the document, i.e. the field of focus. Operation of the markup document, including XHTML and Voice XML is already provided for in existing standards.

The cellular network 12 provides standard audio input and output to the client device 10 through a codec 28 using audio packets, as is standardized in RTP or similar transport protocols and including Distributed Speech Recognition (DSR), as are known in the art. The network 12 also provides a channel that is used to provide the multimodal information to a visual browser 26 of the client device. The multimodal information is transferred as an XHTML file 24. In this example, the multimodal/voice server 14 divides and combines the voice (VoiceXML) and visual (XHTML) portions of the communication between the client device 10 and the web server 20. The dividing and combining requires coordination which is provided by multimodal synchronization of the voice and visual portion of the multimodal document 22 such that the client device receives and presents the multimodal information in a coordinated manner with the voice portion of the information. The client device processes the multimodal information 24 through a resident visual browser 26 while processing the audio packet information through a codec 28, as is known in the art. The separate processing of voice and visual information may cause some coordination problems necessitating the use of local interlock if desired to provide a proper operation for a user. For example, a user could be pressing buttons before field focus can be established. The local interlock can freeze the screen until field focus is established. As another example, when an XHTML form is being shown on the client device, and voice information has been entered the local device can lock out the screen of the device until the voice information has been acknowledged. The locking out of the screen prevents the user from providing text information in the same field of the form, which would result in a race of the conflicting voice and text information through the multimodal/voice server 14.

The multimodal/voice server 14 contains most or all of the processing to exchange multimodal information with a client device 10. Such processing is controlled by a synchronization manager 30. The synchronization manager 30 divides or splits the document 22 into voice dialog information 32 (such as VoiceXML) and multimodal information (XHTML) and synchronizes this information as described above. The voice dialog information is transferred to a voice browser 34 to interface with speech engines 36 on the server 14 to provide properly formatted audio information to the client device 10. Unfortunately, the synchronization needed to keep the two browsers 26,34 coordinated makes the overall system fairly complex, and can still require local lockout on the client device 10. Moreover, a special-purpose multimodal server 14 is required as well as a special protocol for synchronizing the browsers.

The speech engines 36 plays back audio and provides speech recognition, as is known in the art. Speech engines are computationally extensive and require large amounts of random access memory (RAM). Such resources are typically unavailable on a client device, such as a radio telephone, which is why a separate multimodal/voice server 14 is used in this example. The voice browser 34 is a higher level processor that handles dialog, takes relevant events of the markup document and directs the speech engine to play an audio prompt and listen for a voice response. The speech engines then send any voiced responses to the voice browser match form fields. The voice browser contains a memory holding a pre-stored list of acceptable grammar to match with the response from the speech engines. For example a field on the XHTML document may require a "yes" or "no" response, with these being the only acceptable responses. The speech engine will map the incoming voice input to a recognition result that may specify either a recognized utterance allowable by the current grammar(s) or an error code. It will then transfer the recognition result to the voice browser that will then update its internal state to reflect the result, possibly by assigning the utterance to a particular field. The Voice Browser will in turn inform the synchronization manager of the recognition result. In this case, the speech engine will try to match the voice response to either a "yes" or "no" response in its acceptable grammar list, and forward the result to the voice browser which will assign the yes/no result to the appropriate field and inform the synchronization manager.

The synchronization manager 30 tells what field in the document is being acted upon at the present time to the web and voice browser in order to coordinate responses. In other words the synchronization manager determines the field of focus for the browsers. Although this is literally not synchronization, the effect is the same. By definition, a multimodal dialog can include a valid response within a field that can be either audio, through the codec 28, or a keystroke text entry, through the visual browser 26. The synchronization manager handles the possibility of both these events to provide a coordinated transfer of the multimodal information.

Figure 2:
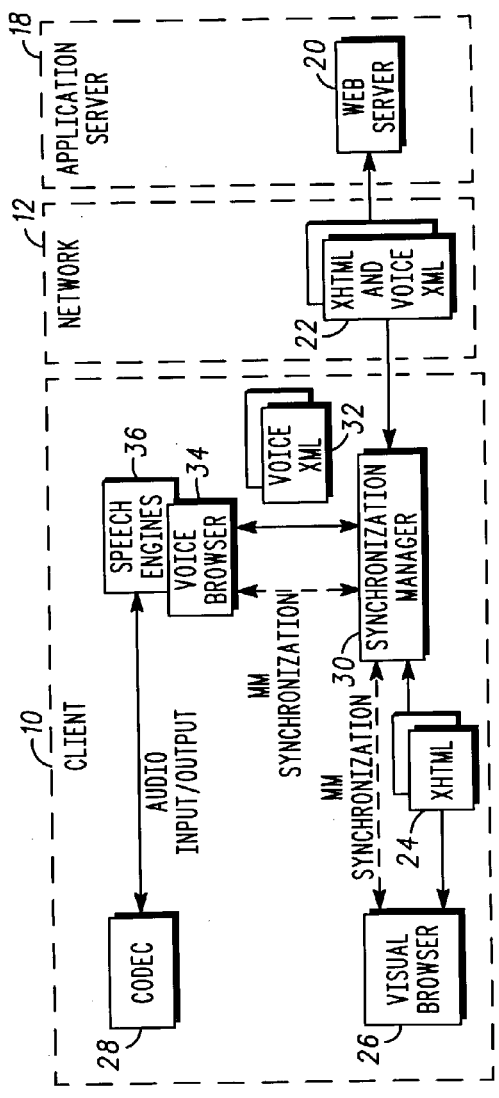
FIG. 2 shows a block diagram of a second prior art multimodal communication system.

FIG. 2 shows a prior art architecture wherein most or all of the processing for multimodal communication is done on the (fat) communication device. As before, a client communication device 10 wants to access a multimodal application present on an application server 18, wherein the application server 18 uses a resident web server 20 to communicate. The web server 20 provides a multimodal markup document 22 exchange directly with the client device 10 (typically by through a cellular network 12 providing an Internet connection through a service provider, e.g. General Packet Radio Service or GPRS). All the multimodal/voice server processes of the previous example are now resident on the client device 10, and operate the same as previously described. Unfortunately, the (fat) device 10 now requires greatly expanded processing power and memory, which is cost prohibitive.

Figure 3:
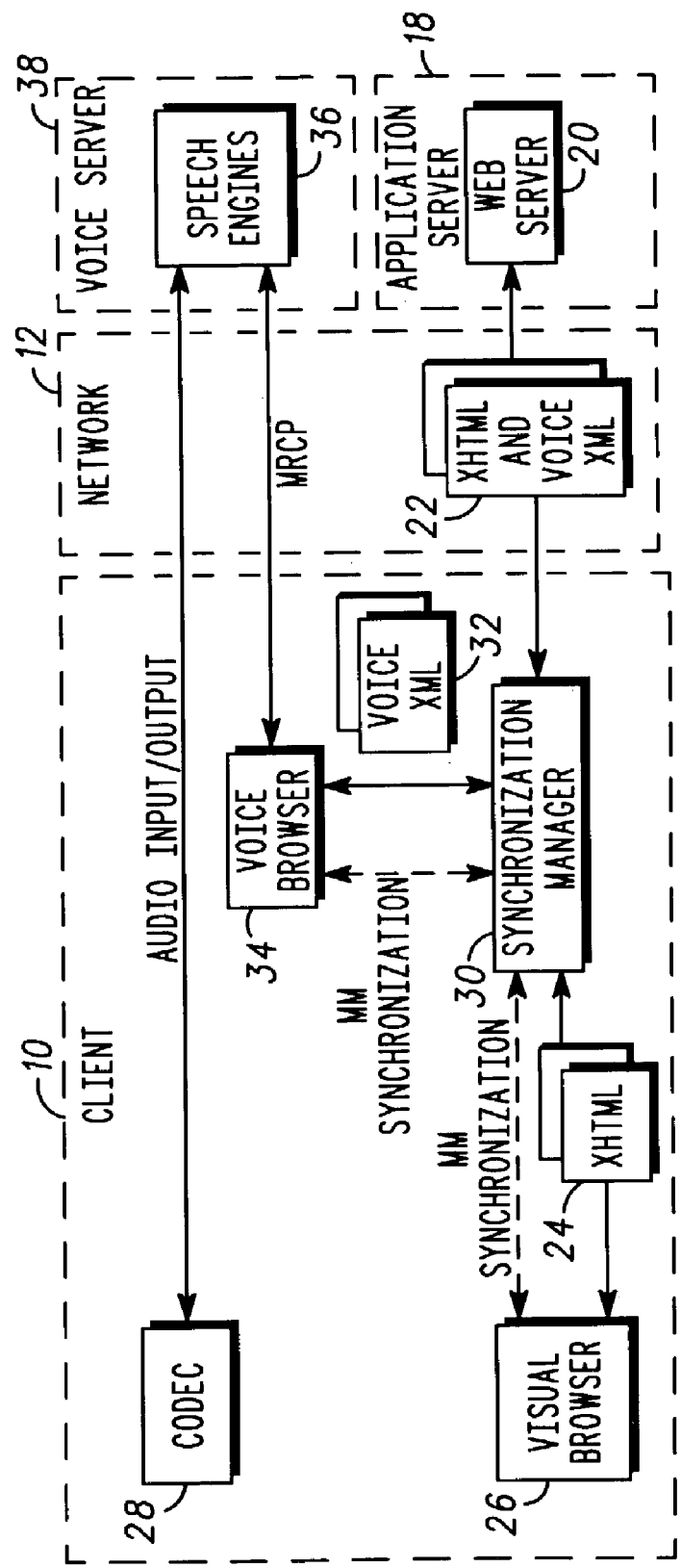
FIG. 3 shows a block diagram of a third prior art multimodal communication system.

FIG. 3 shows a prior art architecture wherein some of the processing for multimodal communication is done remotely, to accommodate limited processing and memory limitations on the communication device 10. As before, a client communication device 10 wants to access a multimodal application present on an application server 18, wherein the application server 18 uses a resident web server 20 to communicate. The web server 20 provides a multimodal file 22 exchange directly with the client device 10 (typically by through a cellular network 12 providing an Internet connection through a service provider). Most of the multimodal/voice server processes of the previous example are still resident on the client device 10, and operate the same as previously described. However, a remote voice server 38 is now provided with speech engines 36 resident thereon. The remote voice server 38 can be supplied by the service provider or enterprise, as presently exist. The voice browser 34 communicates with the speech engines 36 through a defined Media Resource Control Protocol (MRCP). Unfortunately, the (fat) device 10 with remote resources still requires substantially expanded processing power and memory, which is still cost prohibitive. Moreover, there is a large amount of code that will be transferred between the voice browser and the speech engine, which will burden the network and slow down communication.

In its simplest embodiment, the present invention is a voice browser dialog enabler for a communication system. The voice browser enabler includes a speech recognition application comprising a plurality of units of application interaction, which are a plurality of related user interface input elements. For example, in an address book, if a user wanted to create a new address entry, they would need to enter in a name and phone number. In this case, a unit of application interaction would be two input fields that are closely related (i.e., a name field and an address field). Each unit of application interaction has associated voice dialog forms defining fragments. For example, a speech recognition application could be a multimodal browsing application which processes XHTML+VoiceXML documents. Each XHTML+VoiceXML document constitutes a single unit of application interaction and contains one or more VoiceXML forms associated with one or more fields. Each VoiceXML form defines a fragment. A voice browser driver, resident on a communication device, provides the fragments from the application and generates identifiers that identify the fragments. A voice browser implementation, resident on a remote voice server, receives the fragments from the voice browser driver and downloads a plurality of speech grammars, wherein subsequent input speech is matched against those speech grammars associated with the corresponding identifiers received in a speech recognition request from the voice browser driver.

Figure 4:
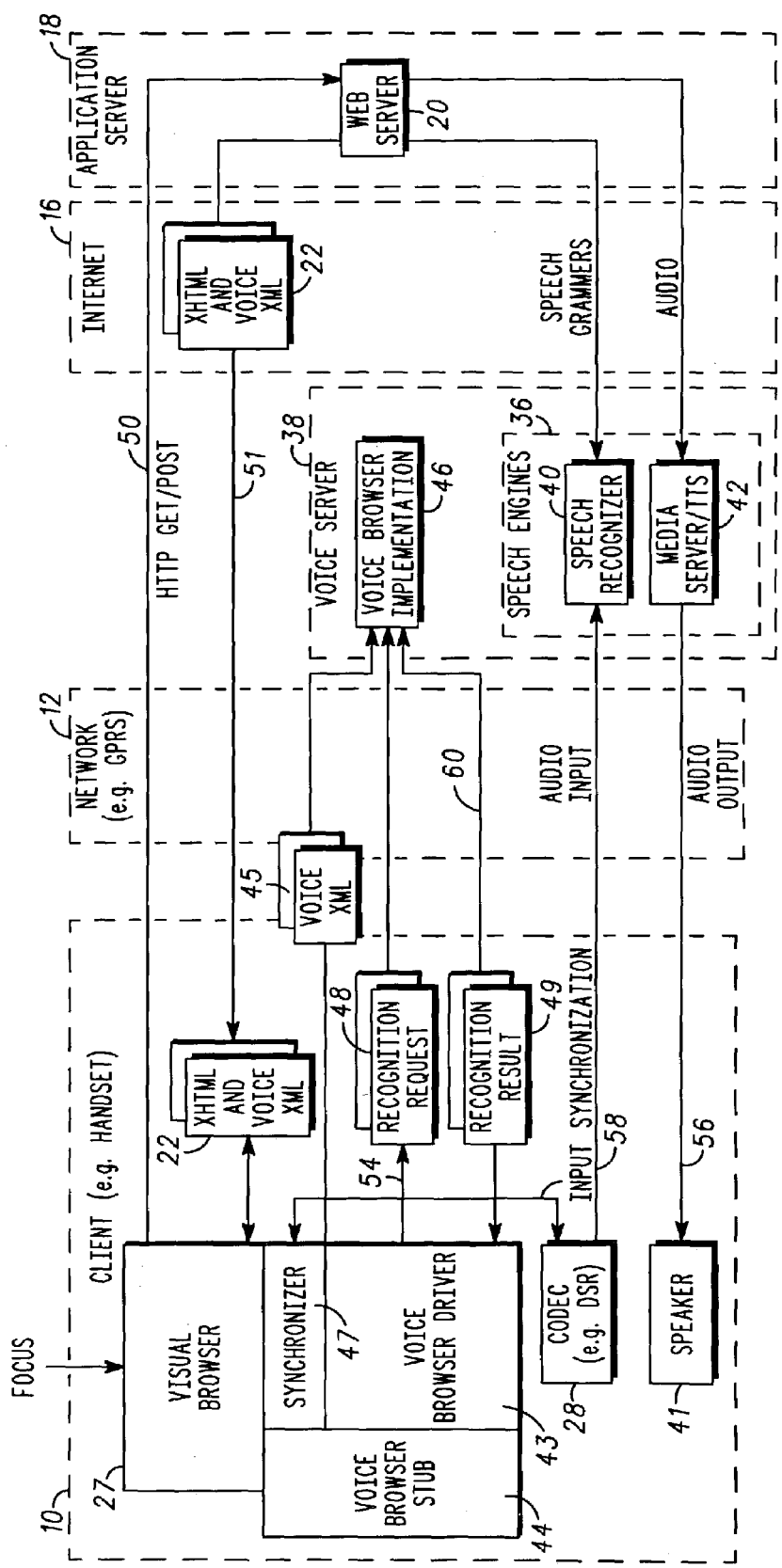
FIG. 4 shows a block diagram of a multimodal communication system with improved voice browser, in accordance with the present invention.

FIG. 4 shows a practical configuration of a voice browser, using the voice browser enabler to facilitate multimodal dialog, in accordance with the present invention. In this example, the application server 18, web server 20, Internet connection 16 and markup document 22 are the same as previously described, but shown in more details to better explain the present invention, wherein the functionality of the voice browser is divided. For example, the markup document 22 also includes URLs showing directions to speech grammars and audio files. In addition, the speech engines 36 are the same as described previously, but with more detail. For example, the speech engines 36 include a speech recognition unit 40 for use with the speech grammars provided by the application server, and media server 42 that can provide an audio prompt from a recorded audio URL or can use text-to-speech (TTS), as is known in the art.

One novel aspect of the present invention is that the present invention divides the voice browser into a voice browser "stub" 44 on the communication device and a voice browser "implementation" 46 on a remote voice server 38. In a preferred embodiment, the voice browser stub 44 is subdivided into a voice browser driver 43 that interfaces with the voice browser implementation 46 and a synchronizer 47 that coordinates the voice browser stub 44 and the visual browser 26. The synchronizer 47 also optionally enables and disables an input to the visual browser 27, based on whether or not the user is speaking to the codec 28 (input synchronization). This subdivision of the voice browser stub allows stand-alone applications running on the client device (e.g., J2ME applications) to be used in place of the visual browser 27 and/or synchronizer 47 and yet reuse the capabilities of the rest of the voice browser stub 44.

Another novel aspect of the present invention is that the visual browser 27 now operates on the full markup document, voice and audio, which eliminates the need for remote synchronization. As a result, the synchronizer 47 has a much smaller and simpler implementation than the synchronization manager of the prior art (shown as 30 in the previous figures). Moreover, the voice browser 43,46 does not use input fields and values as in prior art. Instead the voice browser works with a focused field. This helps simplify the voice browser implementation 46, as will be explained below.

In operation, after a multimodal markup document 22 is fetched from the web server 20, the visual browser sends a copy of it to the voice browser stub. The visual browser sends a copy of it to the voice browser stub. The voice browser stub 44 splits or breaks the voice browser markup (e.g., VoiceXML) out of the document, resulting in a displayable markup (e.g., XHTML) and a voice browser markup (e.g., VoiceXML). The voice browser stub 44 then sends the visual markup to the visual browser for processing and display on the client device as described previously. However, the voice browser driver 43 of the voice browser stub 44 operates differently on the voice browser markup than is done in the prior art. In the present invention, the voice browser driver operates on fragments of the markup document. A fragment is a single VoiceXML form (not to be confused with an XHTML form; although similar to an XHTML form, there is not a one to one relationship between them) and can be thought of as individual pieces of a larger XHTML+VoiceXML document. A form is just a dialog unit in VoiceXML, whose purpose is to prompt the user and typically fill in one or more of the fields in that form. A single input field in an XHTML form can have a single VoiceXML form or fragment associated with it. It is also possible for a set of closely-related XHTML form inputs to have a single VoiceXML form capable of filling in all of the XHTML form inputs. The voice browser driver operates on one focused field or fragment of the markup document at a time instead of the prior art voice browser that operates on an entire document of forms and values.

Further, the voice browser driver uses less processing than prior art voice browser since it is not too difficult to generate VoiceXML forms/fragments from the XHTML+VoiceXML document, since these forms/fragments are already gathered together in the head section of the document. All the voice browser driver need do is find the fragments/forms, associate unique identifiers with them (as will be described below), and have the voice browser stub wrap them up for transmission to the voice browser implementation. The identifier is just a string that uniquely identifies a single VoiceXML form (where uniqueness is only required within the scope of the set of fragments being given to the voice browser implementation, as generated from a single multimodal markup document). The use of fragments and identifiers reduces the amount of data transfer between the client device 10 and remote server 38 through the network 12.

In particular, for a focused field, there is associated a fragment. It should be noted that the voice browser driver can operate independently of whether the field is XHTML or VoiceXML. For example, an XHTML form can ask a user about a street address. In this case, there would be a text field for the street address (number and street), another text field for the (optional) apartment number, another text field for city, a popup menu for the state, and a final text field for the zip code. Now, given this XHTML form, a set of VoiceXML forms can exist that work together to fill in these fields. For example, one VoiceXML form would be capable of filling in both the street address and apartment number fields, and another VoiceXML form could be used to fill in the city and state fields, and a third VoiceXML form could fill in just the zip code. These forms are defined as fragments of the page.

Each of these three VoiceXML forms would have their own unique identifier (i.e. named VoiceXML forms). For example, these identifiers can be called "street+apt", "city+state", and "zipcode", respectively. The "street+apt" VoiceXML form would include an audio prompt that results in the user hearing "say the street address and apartment number" when activated. There would also be a grammar enabled that understands street addresses and optional apartment numbers. The "city+state" VoiceXML form would include an audio prompt something like "say the city name and state" and an appropriate grammar for that. Similarly for the zip code.

The voice browser stub sends the page of associated VoiceXML fragments 45 to the voice browser implementation 46. Then when the voice browser stub 44 needs to listen for user input, it sends a recognition request 48 to the voice browser implementation 46 telling the name or identifier of the form to use for the recognition. As before, the voice server 38 contains the speech grammars, but in this embodiment identifiers are sent that code the voice browser implementation to only look in the "street+apt", "city+state", and "zipcode", grammars to find a match with the previously sent voice fragments. The VoiceXML forms can be transferred once to the voice server 38, processed and then cached. Subsequent requests can identify the cached VoiceXML forms by their identifier. This eliminates the need to transfer and process the VoiceXML markup on every request. As a result, the grammar search is simplified, thereby saving processing power and time. When the identifier for the form/fragment for the street plus apartment field of a document is sent to the voice browser implementation as a recognition request 48, the voice browser implementation will input speech and voice browser 46 will activate the speech recognizer 40 with the appropriate grammars to search for a match, such as a match to an input speech of "Main Street", for example. Once a match is found, the voice browser implementation 46 conveys what the user said as text back 60 ("M-a-i-n-S-t-r-e-e-t") to the voice browser driver 43 as a recognition result 49, which is similar to the prior art. The voice browser stub 44 then takes the result and updates the visual browser 27 to display the result. Although the voice browser implementation 46 can be the same as a prior art voice browser with an interface for the voice browser stub 44, the present invention provides for a simpler implementation since the voice browser now only processes small fragments of simple VoiceXML markup, that do not utilize many of the tags and features in the VoiceXML language.

In practice, the voice browser stub 44 can send the associated fragments 45 for all the fields of a page at one time to the voice browser implementation 46. Afterwards, the voice browser stub 44 coordinates the voice portion of the multimodal interaction for any focused field and sends any speech recognition request identifiers 48 as needed to the voice browser implementation 46 and obtains recognition results 49 in response for that fragment. Preferably, it is desired to make the recognition request 48 and recognition result 49 markup-based (e.g., XML) rather than use a low-level API like MRCP, as is used in the prior art.

Figure 5:
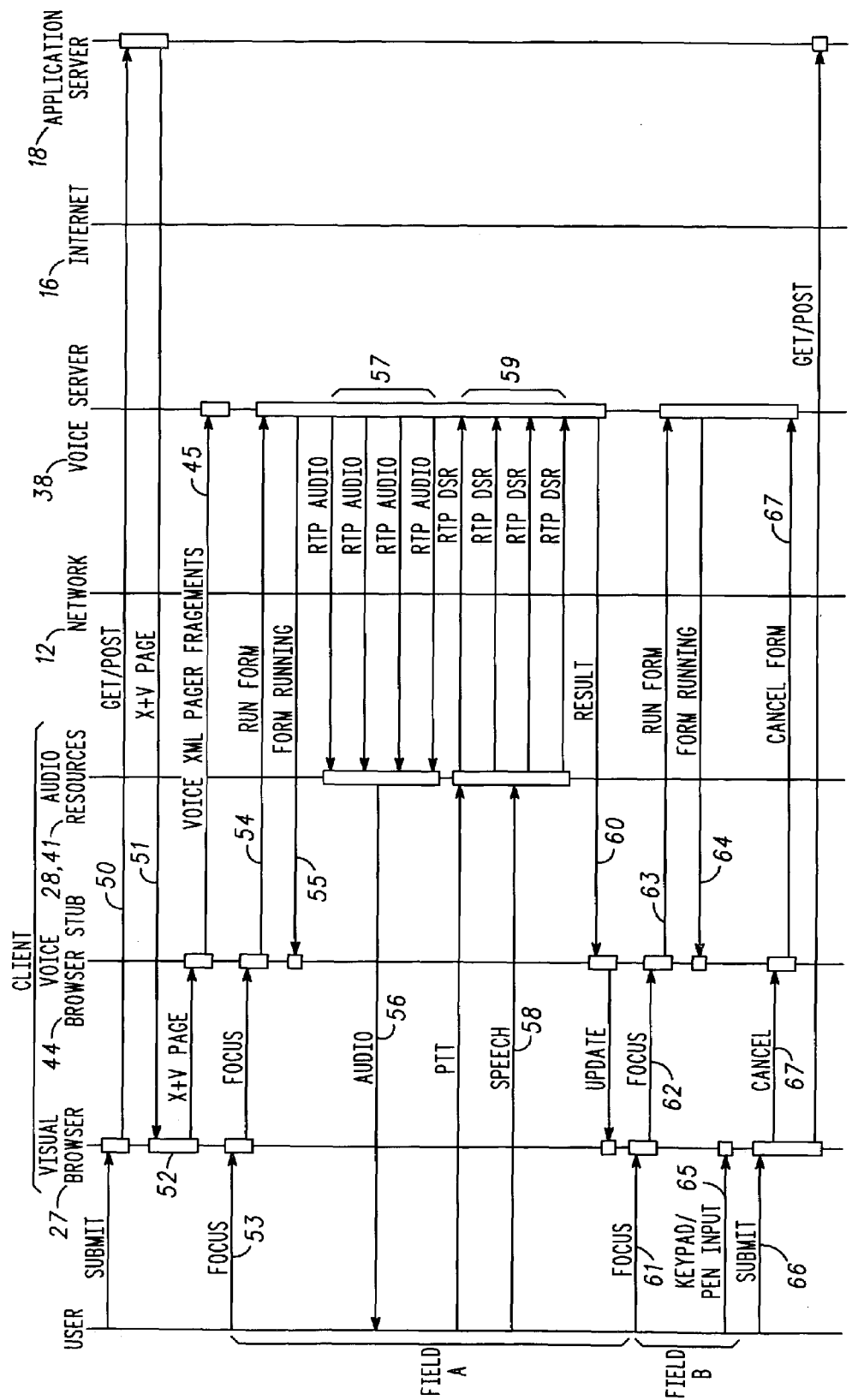
FIG. 5 is a flow chart illustrating the steps of multimodal dialog, in accordance with a preferred embodiment of the present invention.

FIG. 5, in conjunction with FIG. 4, can be used to explain the interaction of a multimodal dialog, in accordance with the present invention. FIG. 5 shows a simplified interaction with two text fields in a markup document, one filled in by voice (A) and one filled in directly as text (B). It should be recognized that multiple voice fields or text fields can be used in a multimodal dialog. A user initiates the dialog by clicking on an Internet address, for example. This directs the visual browser to send an HTTP GET/POST request 50 to the application web server 20 to obtain 51 the desired markup document 22. The document also contains URLs for the acceptable grammars for the document, which can be downloaded to the voice server 38. Once received, the visual browser 27 then runs and renders 52 the document on the screen of the client device 10. The audio and visual document is then handed off to the voice browser stub 44, which splits the voice (VoiceXML) markups out of the document. The voice browser stub also identified the VoiceXML forms (fragments) of the markup and sends these fragments to the voice server 38. At this point, the voice browser implementation 46 and speech engines 36 of the voice server 38 can do an optional background check of whether or not the document is well-formed, and could also pre-process (i.e. compile) the document, fetch/pre-process (i.e. compile, decode/encode) any external speech grammars or audio prompts the document might reference, and synthesize text to speech.

A user then selects a field of the displayed markup document defining a focus 53.

The visual browser 27 receives the focus change, jumps right to the focused field, and transfers the field focus to the voice browser stub 44. The voice browser driver 43 of the voice browser stub 44 then sends 54 identifiers for that field focus of the form as a recognition request 48 the voice server 38, which acknowledges 55 the request. At this point the voice server 38 can optionally prompt the user for speech input by sending 56 one or more audio prompts to the user as Real Time Streaming Protocol (RTP) audio packets 57. The audio is delivered to a speaker 41 audio resource of the client device. The user can then respond by voice by pressing the push-to-talk (PTT) button and sending speech 58 via a codec 28 audio resource of the client device to the voice server 38. The codec delivers the speech as RTP DSR packets 59 to the speech engines of the voice server, which matches the speech to acceptable grammar according the associated identifier for that form and field, and sends a text response 60 as a recognition result to the voice browser driver 43 of the voice browser stub 44. The voice browser stub interfaces with the visual browser 27 to update the display screen on the device and the map of fields and values.

The present invention supplies a solution for providing a multimodal dialog with limited resources. The present invention finds particular application in maintaining synchronized multimodal communication. The method provides a process that divides the processing requirements of a voice browser using minimal processor and memory requirements on the communication device. This is accomplished with only minor software modification wherein there is no need for external synchronization or specialized multimodal server.

Although the invention has been described and illustrated in the above description and drawings, it is understood that this description is by way of example only and that numerous changes and modifications can be made by those skilled in the art without departing from the broad scope of the invention. Although the present invention finds particular use in portable cellular radiotelephones, the invention could be applied to multimodal dialog in any communication device, including pagers, electronic organizers, and computers. Applicants' invention should be limited only by the following claims.

What is claimed is:

1. A voice browser dialog enabler for a communication system, the browser enabler comprising:
   a speech recognition application comprising a plurality of units of application interaction, wherein each unit has associated voice dialog forms defining fragments;
   a voice browser driver, the voice browser driver resident on a mobile communication device; the voice browser driver providing the fragments from the application and generating identifiers that identify the fragments; and
   a voice browser implementation resident on a remote voice server, the voice browser implementation receiving the fragments from the voice browser driver and downloading a plurality of speech grammars, wherein subsequent input speech is matched against those speech grammars associated with the corresponding identifiers received in a speech recognition request from the voice browser driver.

2. The voice browser enabler of claim 1, wherein the speech recognition request and subsequent speech recognition results are markup-based.

3. The voice browser enabler of claim 1, wherein the fragments consist of a VoiceXML page of identified forms.

4. The voice browser enabler of claim 3, wherein the fragments are cached by the voice browser implementation.

5. The voice browser enabler of claim 1, wherein the speech recognition application is a multimodal browser that processes multimodal markup documents, and the voice browser driver is resident in a voice browser stub that operates on a multimodal markup document to split the multimodal markup document into a displayable markup portion and a voice markup portion, and wherein the voice browser driver and voice browser implementation are operable on the voice markup portion.

6. The voice browser enabler of claim 5, further comprising an Internet application server with web server containing the multimodal markup document and the speech grammars.

7. The voice browser enabler of claim 5, further comprising a visual browser in the communication device that is operable on both the displayable markup portion and a voice markup portion of the multimodal markup document.

8. A voice browser for multimodal dialog in a communication system, the browser comprising:
   a multimodal markup document split into a displayable markup portion and a voice markup portion comprising fields, wherein the fields have associated forms defining fragments of the document page;
   a voice browser stub including a voice browser driver portion of a voice browser, the voice browser driver resident on a mobile communication device, the voice browser stub generating the fragments and the voice browser driver generating identifiers that identify the fragments; and
   a voice browser implementation portion of the voice browser resident on a remote voice server, the voice browser implementation down loading the fragments from the voice browser stub and downloading a plurality of speech grammars, wherein subsequent input speech is matched against those speech grammars associated with the corresponding identifiers received in a speech recognition request from the voice browser driver.

9. The voice browser of claim 8, wherein the fragments are VoiceXML forms.

10. The voice browser of claim 8, wherein the speech recognition request and subsequent speech recognition results are markup-based.

11. The voice browser of claim 8, further comprising an Internet application server with web server containing the multimodal markup document and the speech grammars.

12. The voice browser of claim 8, further comprising a visual browser in the communication device that is operable on both the displayable markup portion and a voice markup portion of the multimodal markup document.

13. A method for enabling dialog with a voice browser for a communication system, the method comprising the steps of:
   providing a voice browser driver resident on a communication device and a voice browser implementation containing a plurality of speech grammars resident on a remote voice serve;
   running a speech recognition application comprising a plurality of units of application interaction, wherein each unit has associated voice dialog forms defining fragments;
   defining identifiers associated with each fragment;
   supplying the fragments to the voice browser implementation;
   focusing on a field in one of the units of application interaction;
   sending a speech recognition request including the identifier of the form associated with the focused field from the voice browser driver to the voice browser implementation;
   inputting and recognizing speech;
   matching the speech to the acceptable speech grammar associated with the identifier; and
   obtaining speech recognition results.

14. The method of claim 13, wherein the speech recognition request of the sending step and the speech recognition results of the obtaining steps are markup-based.

15. The method of claim 13, wherein the supplying step includes supplying the voice browser implementation with a VoiceXML page of identified forms.

16. The method of claim 13, wherein the providing step includes the voice browser driver incorporated with a synchronizer into a voice browser stub that interfaces with the voice browser implementation and a visual browser on the communication device.

17. The method of claim 13, wherein the synchronizer is operable to enable an input from an Interact server when speech is detected.

18. The method of claim 13, wherein the running step includes downloading a multimodal markup document as the speech recognition application document.

19. The method of claim 18, wherein after the running step further comprising the step of splitting the multimodal markup document into a displayable markup portion and a voice markup portion containing die units of interaction, and wherein the subsequent steps are operable for only the voice markup portion of the document.

20. The method of claim 19, wherein the providing step includes providing a visual browser in the communication device that is operable on both the displayable markup portion and a voice markup portion of the multimodal markup document.

* * * * *